US008385566B2

(12) United States Patent
Stieler von Heydekampf et al.

(10) Patent No.: US 8,385,566 B2
(45) Date of Patent: Feb. 26, 2013

(54) DECENTRALIZED AUDIO MIXING AND RECORDING

(75) Inventors: Mathias Stieler von Heydekampf, Edina, MN (US); Lee E. Minich, Rochester, NY (US)

(73) Assignee: Mathias Stieler Von Heydekampf, Edina, MN (US)

( * ) Notice: Subject to any disclaimer, the term of this patent is extended or adjusted under 35 U.S.C. 154(b) by 762 days.

(21) Appl. No.: 12/474,630

(22) Filed: May 29, 2009

(65) Prior Publication Data

US 2010/0303260 A1 Dec. 2, 2010

(51) Int. Cl.
*H04B 1/00* (2006.01)

(52) U.S. Cl. .......................................... 381/119; 700/94

(58) Field of Classification Search .................. 381/119; 700/94

See application file for complete search history.

(56) References Cited

U.S. PATENT DOCUMENTS

| | | | |
|---|---|---|---|
| 6,122,665 | A | 9/2000 | Bar et al. |
| 7,853,342 | B2 | 12/2010 | Redmann |
| 8,098,851 | B2 | 1/2012 | Stieler von Heydekampf et al. |
| 2002/0005109 | A1 | 1/2002 | Miller |
| 2002/0144587 | A1 | 10/2002 | Naples et al. |
| 2007/0140510 | A1 | 6/2007 | Redmann |
| 2008/0167740 | A1 | 7/2008 | Merrill |
| 2010/0303261 | A1 | 12/2010 | Stieler von Heydekampf et al. |

FOREIGN PATENT DOCUMENTS

| | | | |
|---|---|---|---|
| EP | 1319299 | B1 | 12/2005 |
| WO | 02/25889 | A2 | 3/2002 |
| WO | 2010/138299 | A2 | 12/2010 |
| WO | 2010/138299 | A3 | 2/2011 |

OTHER PUBLICATIONS

PCT Search Report received for the PCT Application No. PCT/US2010/034322, mailed on Dec. 20, 2010, 3 pages.

Office Action received for the German Application No. 10 2009 059 167.2, mailed on Jul. 26, 2011, 7 pages of Office Action and 3 pages of English Translation.

*Primary Examiner* — Douglas Menz
(74) *Attorney, Agent, or Firm* — Cool Patent P.C.

(57) ABSTRACT

Briefly, in accordance with one or more embodiments, a decentralized mixer includes an audio input circuit to receive one or more local audio input signals, a network adapter to couple to a network and to receive one or more mix busses from one or more other mixers coupled to the network, a digital signal processor to create a local mix of the local audio input signals in combination with the mix busses from the network, and a recording circuit to record the local mix, and/or to record the raw signals from the mix busses and the local audio input signals.

20 Claims, 5 Drawing Sheets

DECENTRALIZED AUDIO MIXING AND RECORDING

BACKGROUND

Many musicians may be part time musicians and/or in a band in which they play in garages, at parties, and/or at semi-professional venues such as coffee houses, bars, and/or clubs. Typically, such venues or other situations do not allow for the band to hire or otherwise use a professional mixer or sound man to mix the band during the performance. Furthermore, each member of the band may prefer to have his or her own personal mix while playing instead of receiving a master mix which may not allow the musician to properly hear his or her own voice or instrument relative to other vocals or instruments in the band. In addition, bands having professional aspirations may desire to record their performance for songwriting purposes, for later practicing their songs, and/or to create demo recordings to obtain a recording contract. In such situations, it may not be prudent for the band to rely on a master mix provided by a hired third party mixing board operator who may not be sufficiently familiar with the band's desired sound and/or style. Furthermore, the members of the band may wish to be their own producers and control their band's sound to their own tastes and preferences. As result, it may not be desirable or in the band's best interests to utilize a centralized master mix of the band's performance.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
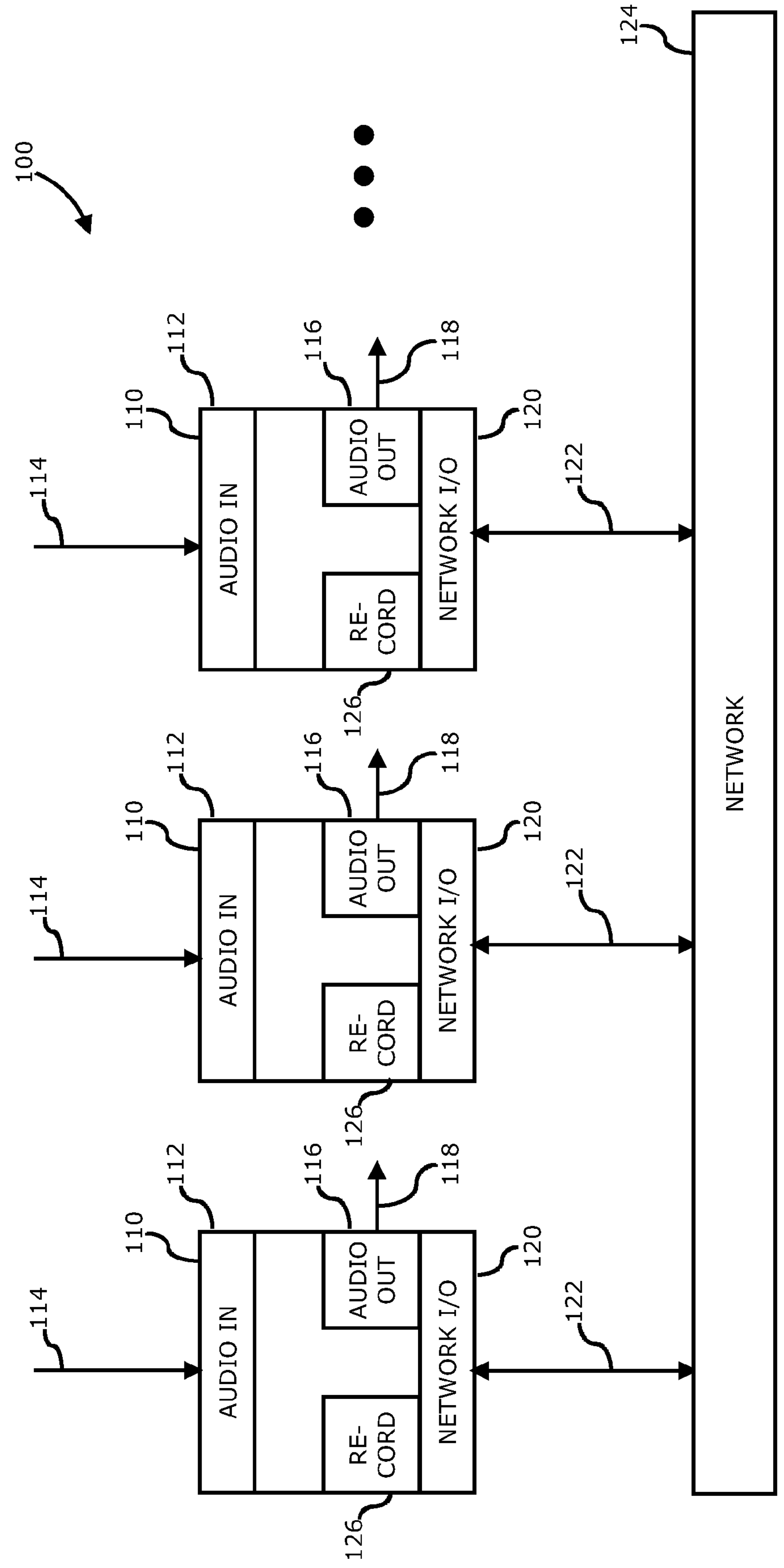
FIG. 1 is a diagram of a decentralized mixing system comprising two or more decentralized mixers in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now FIG. 1, a diagram of a decentralized mixing system comprising two or more decentralized mixers in accordance with one or more embodiments will be discussed. As shown in FIG. 1, decentralized mixing system 100 may comprise an expandable, decentralized audio signal mixing system capable of utilizing networking technology for real-time, or near real-time, audio applications with integrated multi-track recording capability. Decentralized mixing system may comprise one or more mixers 110 capable of coupling to network 124 to provide interconnectivity between two or more mixers 110. In one or more embodiments, network 124 may comprise standard networking technology as such an interconnectivity backbone, wherein network may operate in compliance with one or more networking standards such as Ethernet, Fast Ethernet 100 BASE-T with Ethernet Audio Video Bridging (AVB) in accordance with an Institute of Electrical and Electronics Engineers (IEEE) standard such as IEEE 802.1, IEEE 802.1ak, IEEE 802.1AB, IEEE 802.1AS, IEEE 802.1D, IEEE 802.1Q, IEEE 802.1Qat, IEEE 802.1Qav, Universal Serial Bus (USB), IEEE 1394, and so on, although the scope of the claimed subject matter is not limited in this respect. In some embodiments, network 124 may comprise an audio network and/or bus such as a Dante audio network or the like type of connectivity protocol as merely one example, and the scope of the claimed subject matter is not limited in this respect. In one or more embodiments, at least a portion or all of network 124, may comprise a wired link based network, and in one or more alternative embodiments, at least a portion or all of network 124 may comprise a wireless link based network. In embodiments where network 124 at last in part comprises a wireless link based network, network 124 may be in compliance with one or more wireless standards such as, for example, IEEE 802.11a, IEEE 802.11b, IEEE 802.11g, IEEE 802.11n, and so on, for example where network 124 comprises a wireless local area network (WLAN). Alternatively, network 124 may at least in part comprise a personal area network (PAN) such as a Bluetooth or Ultra-wide band (UWB) type network, Wireless Universal Serial Bus (WUSB), and/or in some embodiments network 124 may at least in part comprise a wireless wide area network (WWAN) such as a Third-Generation (3G) network, a Third Generation Partnership Project (3GPP) network, a Fourth-Generation (4G) network, a time division multiple access network, a code division multiple access network (CDMA) network, a wideband code division multiple access (W-CDMA), a Worldwide Interoperability for Microwave Access (WiMAX) network, an IEEE 802.16 network, and so on. In addition to wireless communications, mixer 110 may implement wireless power and or wireless charging, for example to charge an internal battery of mixer 110 via an induction based charger. However, these are merely example standards for and/or implementations of network 124, wired and/or wireless, and wired and/or wireless power or charging, and the scope of the claimed subject matter is not limited in this respect.

One or more of the decentralized mixers 110 may comprise an audio input circuit block 112 capable of receiving one or more audio inputs 114 to a respective decentralized mixer. For example, audio inputs 114 may receive one or more line level, microphone level, and/or instrument level inputs to be handled and/or processed by the decentralized mixer 110, typically by the user of the particular decentralized mixer. For example, such a user may be a musician in a live band, rehearsal, and/or recording environment wherein the audio inputs 114 may be received by decentralized mixer 110 from the user's musical instrument, from the user's microphone, and/or from any other audio device used or controlled by that musician. Decentralized mixer 110 may also comprise an audio output circuit block 116 that provides one or more audio outputs 118 from the decentralized mixer. For example, audio outputs 118 may comprise a line level output, a microphone level output, an instrument level output, a headphone output, and so on. The sound provided at the audio output 118 may comprise a particular sound mix selected by the user of that particular decentralized mixer according that that user's own tastes and preferences. As will be discussed in further detail, below, each decentralized mixer 110 may receive audio signals from one or more other decentralized mixers 110 to which a given decentralized mixer 110 may be coupled so that each user of a given decentralized mixer 110 may generate his or her own mix of some or all of the inputs of the other decentralized mixers. Such an arrangement of mixers may be referred to as decentralized mixing as no one device or mixer acts or functions as a master mixer for any other decentralized mixer, and/or the decentralized mixers 110 may be capable of providing a sound mix unique to that particular mixer at least partially or wholly independent of the other mixers except that all or nearly all of the audio input signals 114 of all or nearly all of the decentralized mixers may be provided to all or nearly all of the other decentralized mixers 110 in decentralized mixing system 100. In one or more embodiments, decentralized mixer 110 includes a network input/output (I/O) circuit block 120 to couple the decentralized mixer 110 to other decentralized mixers 110 on network 124 via network link 122. In one or more embodiments, I/O circuit block comprise a network adapter or similar circuit, although the scope of the claimed subject matter is not limited in this respect. As a result, mixing of a group of signals in decentralized mixing system 100 may be decentralized without requiring a master mixing unit and/or without requiring a master mixer operator.

Thus, in accordance with one or more embodiments, in contrast to a centralized mixing system, there is no master unit required for functionality and/or no fixed number of mix busses. As more system mixers 110 are added to decentralized mixing system 100, the number of mix busses may respectively increase. Furthermore, it should be noted that audio input 114 may comprise any number or inputs, and placing such inputs directly onto each mixer 110 of decentralized mixing system 100 allows the addition of as many audio inputs and/or channels to decentralized mixing system 100 as network 124 is capable of accommodating. As a result, each mixer 110 is capable of providing its user individual control over all available system input signals on decentralized mixing system 100. Consequently, the user of a particular mixer 110 unit is capable of creating a unique stereo mix and is further capable of deciding how his or her specific mix is to be reproduced, for example via headphones, in-ear monitors, loudspeakers, and so on. In one or more embodiments, all or nearly all signals existing on network 124 are available in an unaltered state, unmixed and/or unprocessed, for additional uses such as, for example, a multichannel output device connected to a traditional mixing console or external recording system. In addition, the arrangement of decentralized mixing system 100 allows for instantaneous, or nearly instantaneous, multi-track recording of the raw, unaltered signals to a recording system circuit block 126 internal to mixer 110 without requiring additional external recording devices. In general, it should be noted that in one or more embodiments, the concept of decentralized mixing may refer to a mixing system 100 in which a master mixer unit is not required, and wherein two or more decentralized mixers may communicate with one another such that all, or nearly all of the inputs of a given decentralized mixer may be available at all or nearly all of the other decentralized mixers. Further, in such a decentralized mixing system, one or more decentralized mixers 110 may be added as a node in decentralized mixing system 100 according to the protocols of the coupling mechanism such as network 124. In theory, the number of mixers 110 able to be added as nodes may only be limited by the standards of network 124, for example where the maximum number of Ethernet nodes may be 1024. However, even where the limit of the particular network may be reached, additional mixers may be added as nodes in decentralized mixing system 100 in one or more embodiments, for example using networking expansion techniques such as coupling multiple networks via routers, bridges, servers, and so on so that the number of mixers 110 may be expanded even further if desired. In such embodiments, any one or more of the mixers 110 may be remotely disposed from one or more of the other mixers 110, for example where network 124 is part of and/or comprises the Internet. It should be appreciated that these are merely some example applications of decentralized mixing system 100, however the scope of the claimed subject matter is not limited in these respects.

In one or more embodiments, the decentralized mixers 110 may be connected to one or more other decentralized mixers 110 via a common connection capable of providing sufficient performance for a live audio application. As discussed, above, such a common connection may comprise network 124 which may comprise a suitable Ethernet or Dante network or the like. In one particular embodiments, decentralized mixers 110 provide two local audio inputs 114 and stereo audio outputs 112, although the scope of the claimed subject matter is not limited in this respect. The mixer 110 transmits its two local input signals to network 124 and in turn receives from the network 124 all or nearly all other input signals transmitted by the other mixers 110. The mixers may include their own respective digital signal processors (DSP) to provide processing of one or more of the signals received from the other mixers 110 on network 124, for example equalization, level, mute, panorama and/or other audio effects for each available signal so that with each mixer 110 an individual mix comprising all or nearly all of the network signals can be created at the respective mixers 110. In one or more embodiments, a digital signal processor may refer to a microprocessor designed to process real-time or near real-time processing of mathematical algorithms, such as multiply and accumulate, matrix, and/or convolution type algorithms, generally faster and/or more efficiently than a general purpose microprocessor. The thus created stereo mix signal may then available on the audio output 118 of the respective mixer, and as a result no central master mixing module needed. In one or more embodiments, decentralized mixing system 100 is capable of being expanded by adding one or more additional mixers 110 to network 124. In such an arrangement, additional mix busses are added as additional mixers 110 are added which allows per mixer 110 a completely separate and/or independent sound mix utilizing all the same signals available on network 124. In one or more particular embodiment, For a given decentralized mixer 110 is capable of automatically detecting other decentralized mixers 110 as the mixers are added to network 124 wherein the audio signals and/or mix busses from newly added mixers 110 maybe automatically added to a individual mixer's particular sound mix and may further be available for additional processing and/or mixing by the respective user of the detecting mixer 110. In one or more embodiments, network protocol utilized in decentralized mixing system 100 may be capable of providing data traffic shaping and/or management such that decentralized mixing system 100 may be suitable for real-time or nearly real-time live audio, for example to provide suitable audio frequency bandwidth and/or signal latency.

In one or more embodiments, one or more of the mixers 110 may include two inputs per unit as just one example. In some embodiments, decentralized mixer system 100 may be capable of accommodating one or more mixers 110 having more than two local inputs at the mixer 110. Furthermore, different mixers 110 may have a different amount of inputs per mixer unit. For example, mixers 110 having two, four, and eight inputs are capable of working together at the same time in the same decentralized mixing system 100. Furthermore, in addition to a differing number of inputs, different mixers 110 having differing architectures may likewise interoperate in the same decentralized mixing system, and the scope of the claimed subject matter is not limited in these respects. Details of one example architecture of a decentralized mixer 110 in accordance with one or more embodiments are shown in and described with respect to FIG. 2, below.

Figure 2:
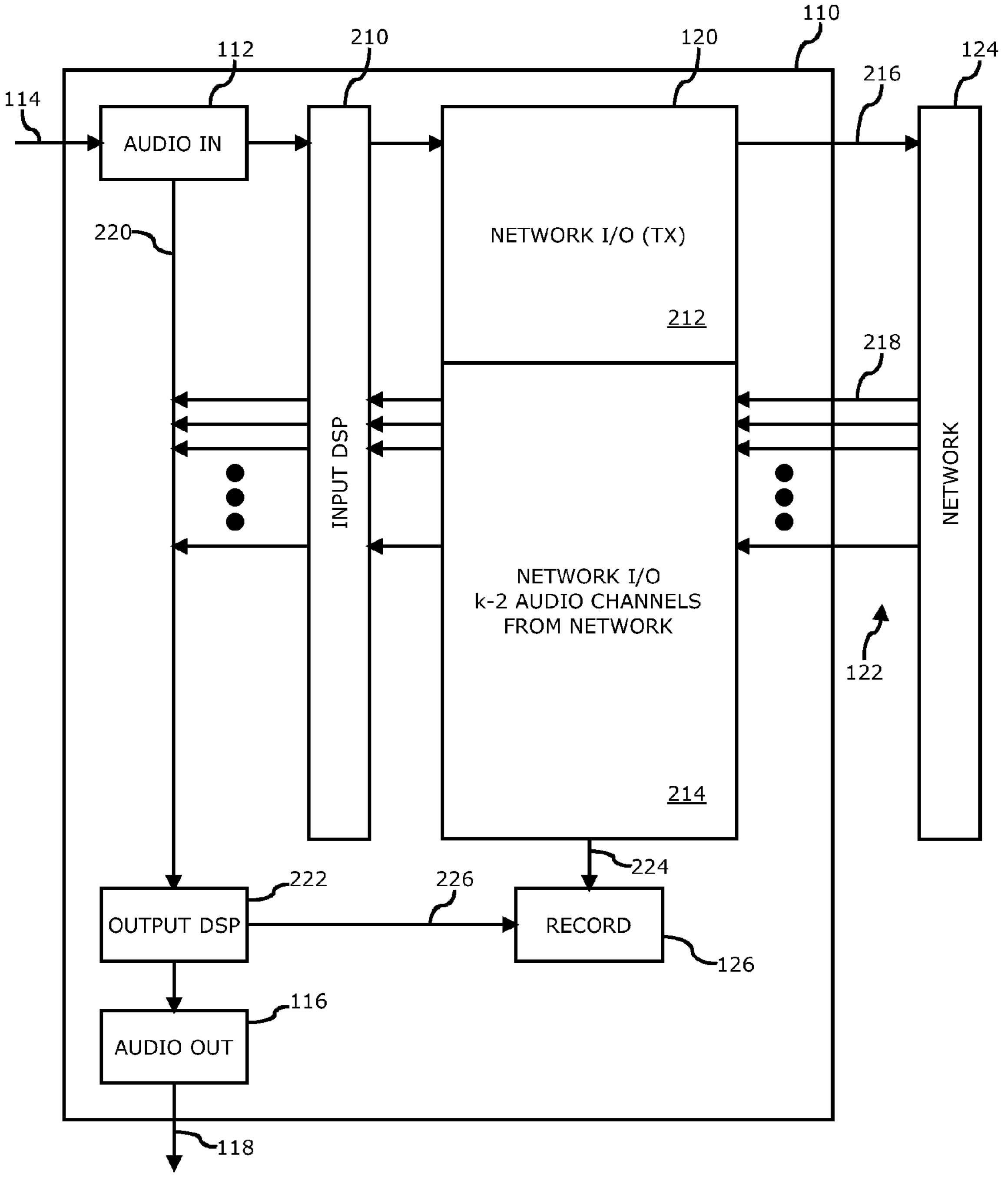
FIG. 2 is a diagram of the architecture of a decentralized mixer in accordance with one or more embodiments.

Referring now to FIG. 2, a diagram of the architecture of a decentralized mixer in accordance with one or more embodiments will be discussed. The embodiment of decentralized mixer 110 as shown in FIG. 2 may comprise one particular implementation, however in other embodiments alternative architectural implementations may be utilized, and the scope of the claimed subject matter is not limited in this respect. In one or more embodiments, decentralized mixer 110 may include two or more audio inputs 114 to audio input circuit block 112 which may comprise analog or digital inputs and/or microphone level, instrument lever, and/or line level inputs which may be converted according to a selected network protocol to network signals 216 via network I/O (TX) circuit block 212 of network I/O circuit block 120 for transmission via network 124. Likewise, mixer 110 is capable of receiving all or nearly all signals 218 available on network 124 of decentralized mixing system 100 via network I/O (RX) circuit block 214 of network I/O circuit block 120. An input digital signal processor (DSP) circuit block 210 in the mixer 110 allows each available signal, meaning the local audio inputs 114 as well as the network signals 218, to be edited in sound, for example equalization, effects, dynamics, level control and/or panorama control, and so on, and brought into the individual mix of mixer 110 via output DSP 222. In one or more embodiments, input DSP 210 and output DSP 222 may comprise two functional circuit blocks of a single digital signal processor device, and in one or more alternative embodiments, input DSP 210 and output DSP 222 may comprise two separate DSP devices, and the scope of the claimed subject matter is not limited in this respect. The particular local mix provided by output DSP 222 allows the user of mixer 110 to create a specific monitor mix of all or nearly all the available signals in a manner how he or she would like to hear it in order to accommodate the user's own particular performance and musical feeling. Likewise, each user of a respective mixer 110 in decentralized mixing system 100 may create his or her own unique local mix independent of the other mixes created by the other users. Thus, in one or more embodiments no one unit functions as a master mixer, although the scope of the claimed subject matter is not limited in this respect. In one or more embodiments, the user's local mix signals 226 may be sent to recoding circuit 126 for recording of that particular local mix. In addition to the local mix, all or nearly all of the individual input signals from the mixers 110 on network 124 may be directly recorded as raw, unmixed and unprocessed signals for later use, for example to remix a particular performance in a different manner than any of the local recorded mixes. In one or more embodiments, record circuit 126 includes a suitable storage medium for recording the local and/or the raw mixes, for example a hard disk drive (HDD), a semiconductor device such as flash memory or the like such as a Secure Digital High-Capacity (SDHC) card, a chalcogenide or phase-change type memory, and so on. Furthermore, recording circuit 126 may also couple to an external bus or device for recoding at least part of the local mix and/or the raw signal on an external device such as an external hard disk drive or the like coupled to mixer 110 via a universal serial bus (USB), an IEEE 1394 or FireWire interface, and so on. It should be noted that these are merely example recording methods and/or media, and the scope of the clamed subject matter is not limited in these respects.

Figure 3:
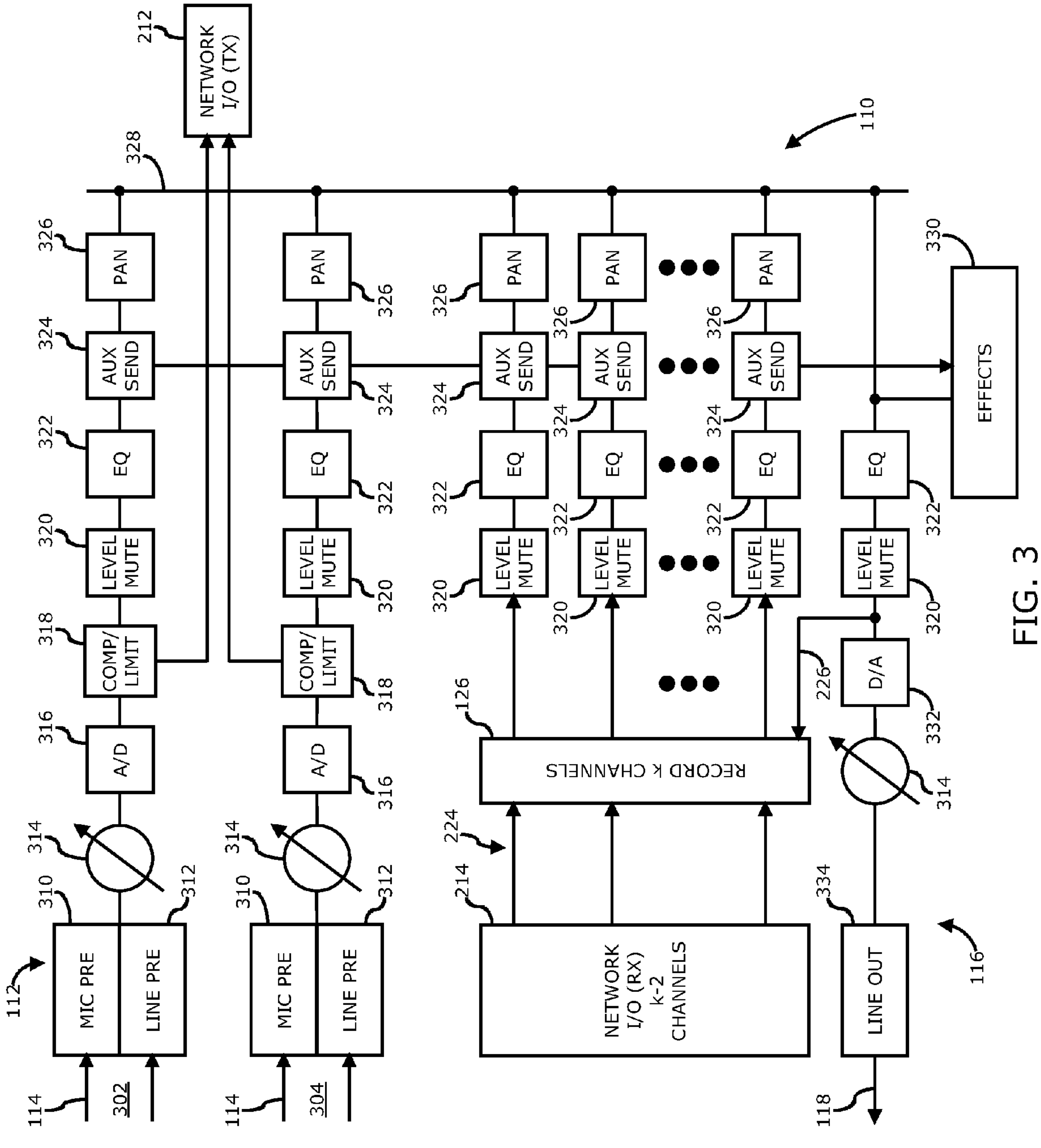
FIG. 3 is a diagram of the architecture of a decentralized mixer showing detailed circuit blocks of the mixer in accordance with one or more embodiments.

Referring now to FIG. 3, a diagram of the architecture of a decentralized mixer showing detailed circuit blocks of the mixer in accordance with one or more embodiments will be discussed. The architecture of decentralized mixer 110 shown in FIG. 3 is substantially similar to the architecture shown in FIG. 2 but showing additional functional circuit blocks. In one or more embodiments, decentralized mixer 110 may comprise a first channel 302 and a second channel 304 capable of receiving various audio inputs 114. A given channel may include a microphone preamplifier circuit 310 and/or a line level preamp circuit 312 for receiving an audio signal from a microphone or a line level instrument or device. The input signal is then passed through a potentiometer 314 to control the signal level of the input signal provided to the channel. In one or more embodiments, potentiometer 314 may be incorporated into a preamplifier circuit to control the gain of the preamplifier, or alternatively may be part of an attenuating circuit to selectively attenuate the signal provided by the preamplifier circuit. The analog signal may then be digitized via analog-to-digital (A/D) converter 316 for digital signal processing of the signal on the channel. The signal processing at this point in the channel is typically analog processing generally corresponds to audio input circuit 112 as shown in FIG. 1. Digital signal processing of an input signal may be generally performed with input DSP 210 as shown in FIG. 2. Various digital signal processing circuit blocks may include, but are not limited to, a compressor/limiter circuit block 318, a level mute circuit block 320, an equalization (EQ) circuit block 322 which may include a graphic equalizer and/or a parametric equalizer, an auxiliary send circuit block 324 for sending the processed signal to other circuit blocks in mixer 110, and/or a pan circuit block 326. The outputs of one or more channels may be combined at local mix bus 328, and direct versions of the input signal on an input channel such as channel 302 and/or channel 304 may be provided to network I/O (TX) circuit block 212 for providing the input signals of mixer 110 to network 124 to be available to other mixers 110 on network 124.

In addition to one or more input channels for receiving and processing audio input signals 114, one or more other signals may be received from network 124 via network I/O (RX) circuit block 214 for processing and mixing by mixer 110. In one or more embodiments, the decentralized mixers 110 have two input channels that are provided to other mixers 110 via network 124 for k total channels available on network 124. Thus, mixer 110 receives two channels as local inputs and k-2 channels received from other mixers 110 on network 124. The k-2 channels 224 from network 124 are combined with the two local channels to allow mixer 124 to record the k total channels available on network 124 via recording circuit block 126. The received k-2 channels from network 124 may likewise be processed and added to the local mix via circuit blocks such as level mute circuit block 320, EQ circuit block 322, auxiliary send circuit block 324, and/or pan circuit block 326 and combined into the local mix at local mix bus 328. The auxiliary send circuit blocks 324 may send the signals from one or more of the channels to an effects circuit block 330 for additional audio effects processing, for example chorusing, flanging, echo or delay, reverb, vibrato, and so on. Effects circuit block 330 may be handled by output DSP 222 which may also handle additional output circuit blocks for overall processing of the local mix, such as EQ circuit block 322 and/or level mute circuit block 320. In one or more embodiments, the effects circuit block 330 may be capable of providing instrument, guitar, bass, microphone, device, amplifier, and/or speaker modeling on any one or more signals in the mixer 110. Furthermore, effects circuit block 330 may also provide room analysis and correction to reduce, compensate for, and/or eliminate undesirable room effects such as feedback, reverb or echo and delay, or equalization. In such embodiments, a built-in microphone may be used to receive an ambient audio input signal to perform such analysis, or alternatively such analysis may be based on any one or more of the inputs to the mixer 110 such as a microphone, instrument, and so on. However, these a merely examples of the audio functions that may be provided by effects circuit block 330, and the scope of the claimed subject matter is not limited in these respects. The overall local mix 226 may be provided to recording circuit 126 for recording of the local mix. The local mix signal may also be provided as an output of mixer 110, for example for local monitoring by the user, via digital-to-analog (D/A) converter circuit block 332, potentiometer 314 and line output amplifier 334 which may provide line level signals and/or headphone level signals as audio output signals 118. In general, line output amplifier 334, potentiometer 314, and D/A circuit block 332 may comprise audio output circuit block 116.

Figure 4:
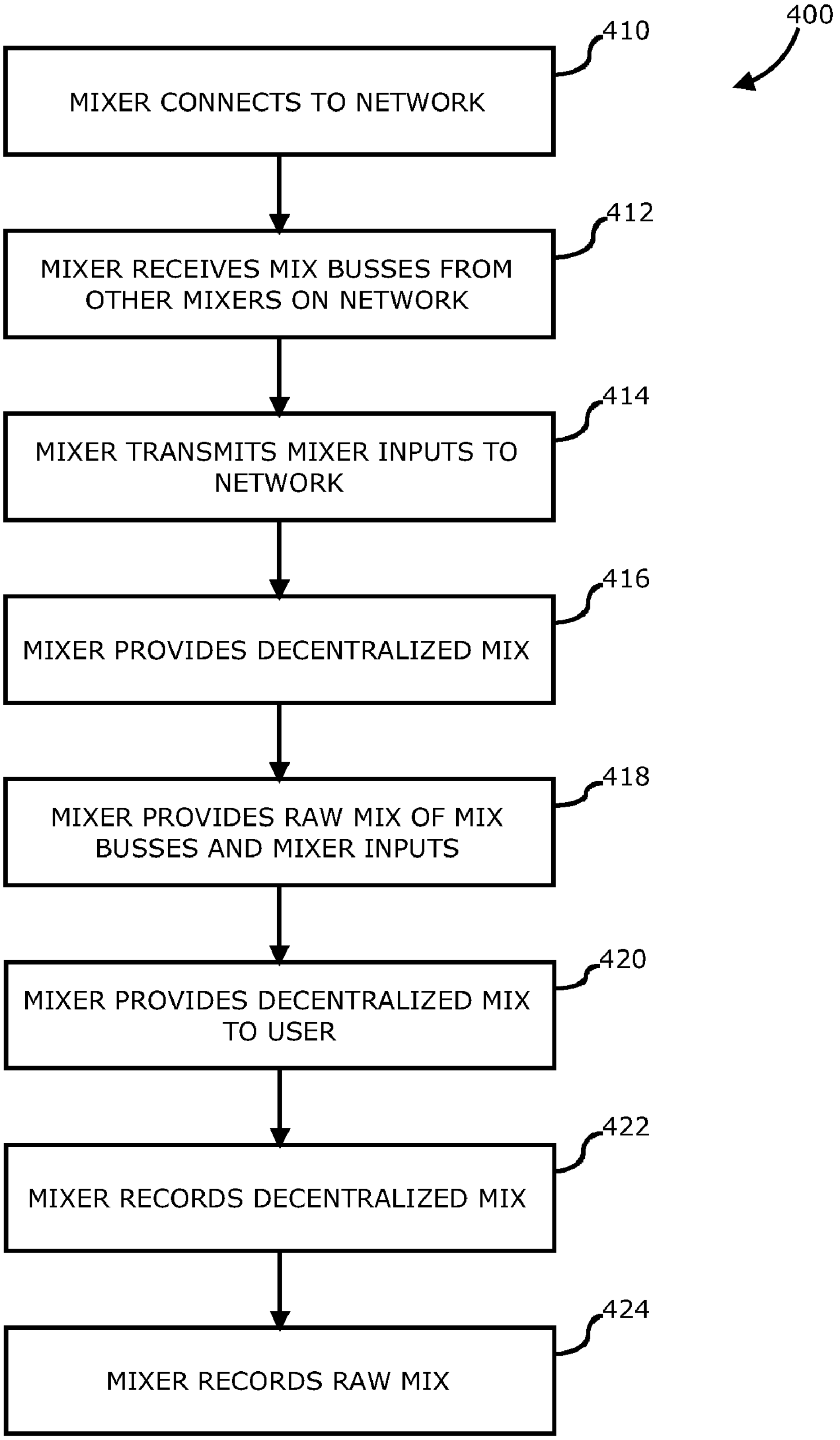
FIG. 4 is a flow diagram of a method for decentralized mixing in accordance with one or more embodiments.

Referring now FIG. 4, a flow diagram of a method for decentralized mixing in accordance with one or more embodiments will be discussed. The method 400 shown in FIG. 4 may be implemented by decentralized mixer 110 of FIG. 1, FIG. 2, and/or FIG. 3 during operation thereof. It should be noted that method 400 shows a particular number and/or order of the circuit blocks, however method 400 is not so limited wherein the circuit blocks shown in FIG. 4 may be implemented in other orders than that shown in FIG. 4, and furthermore method 400 may include fewer or more circuit blocks than shown in FIG. 4, and the scope of the claimed subject matter is not limited in these respects. In one or more embodiments of method 400, mixer 110 connects to network 124 at circuit block 410, for example via known and/or standard networking protocols. Mixer 110 receives one or more mix busses from network 124 at circuit block 412 corresponding to the mix busses provided by the other mixers 110 on network 124. It should be noted that as additional mixers 110 are added to network 124, the mixers 110 on network 124 receive additional mix busses from the added mixers 110. Likewise, mixer 110 transmits its own inputs to network 124 at circuit block 414 to provide its mix bus to the other mixers 110 on network 124. block 416, mixer provides its own decentralized mix as a local mix. In one or more embodiments, the decentralized mix provided at block 416 may be provided in response to inputs from the user of mixer 110, for example where the user creates his or her own unique mix at decentralized mixer 110 according to his or her own preferences separate from other mixes that may be provided at the other decentralized mixers 110. In one or more alternative embodiments, the mix provided by mixer 110 at block 416 may be an automatic mix generated by a program that automatically provides a local mix according to the program. In some embodiments, such an automatic mix may be generated according to a preset, for example an acoustic mix preset, a rock mix preset, a choir mix preset, and so on. In one or more alternative embodiments, an automatic mix may be based at least in part on one or more parameters selected by the user. For example, the automatic mix program may have a parameter that maintains the lead vocal at a level 10% higher than the levels of the rest of the inputs. In general, an automatic mix may be programmed to provide priority mix settings for a given one or more inputs in response to conditions or parameters. However, it should be known that these are merely examples of a decentralized, local mix that may be provided by a given decentralize mixer 110, however the scope of the claimed subject matter is not limited in these respects.

At circuit block 418, mixer creates a raw mix of the mix busses received from other mixers 110 on network 124 in combination with the mixer's own local mixer inputs. It should be noted that the raw mix merely refers to a group of all or nearly all the signals available on network 124 including the local signals, and may not necessarily be a "mix". In some embodiments, the raw mix may include at least some normalization of the input signals so that the signal levels are suitable for recording at an optimal dynamic range to facilitate a later mix of the recorded raw mix signals. Thus, the raw mix may mean that the signals are completely unprocessed and unmixed, and/or may be minimally processed to facilitate the recording process, and the scope of the claimed subject matter is not limited in this respect. At circuit block 420, mixer 110 provides the decentralized local mix to the user for monitoring of the local mix during operation of mixer 110, for example during a live performance or rehearsal. The mixer 110 records the local, decentralized mix at circuit block 422, and records the raw mix at circuit block 424.

Figure 5:
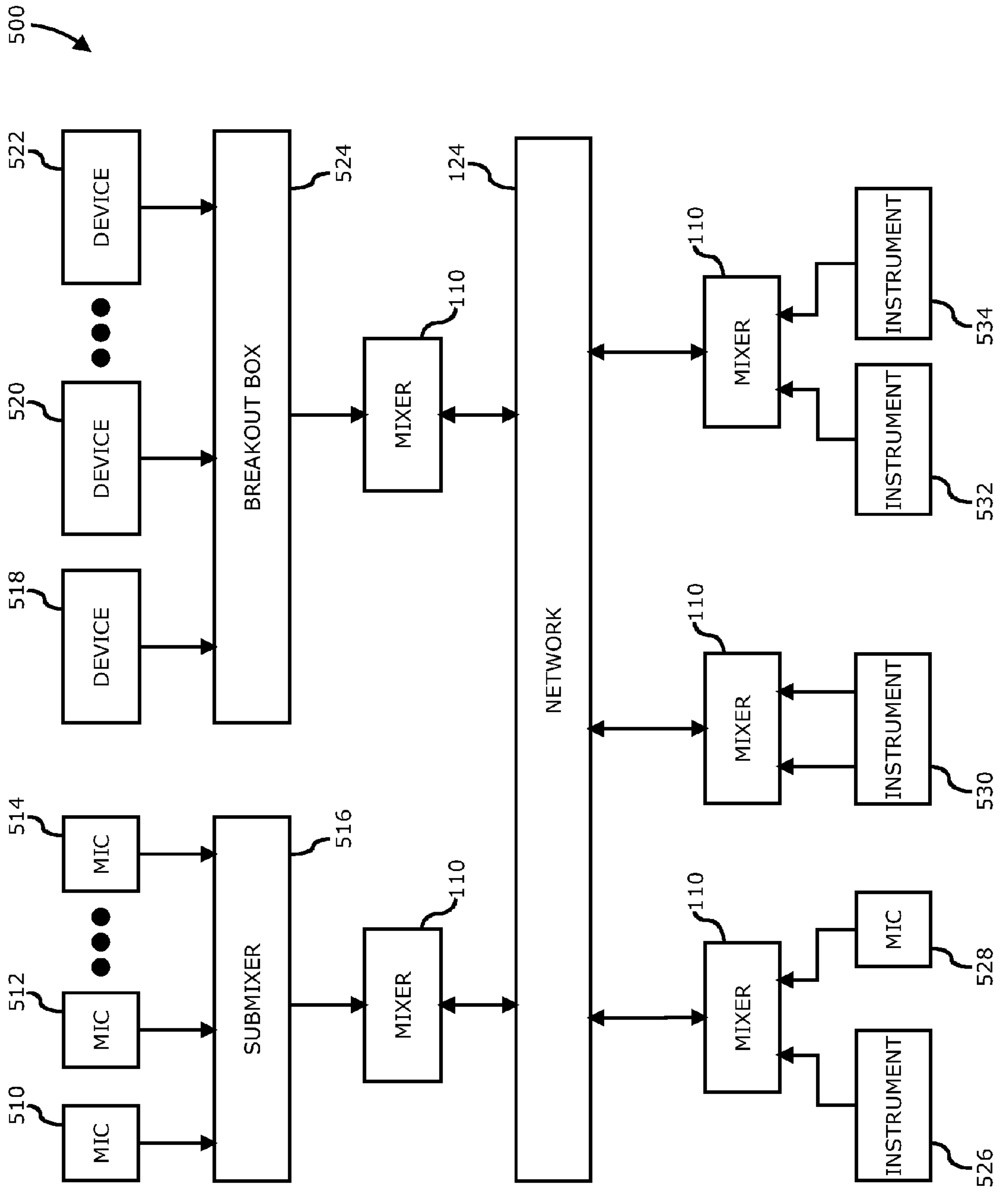
FIG. 5 is a diagram of one implementation of a decentralized mixing system in accordance with one or more embodiments.

Referring now to FIG. 5, a diagram of one implementation of a decentralized mixing system in accordance with one or more embodiments will be discussed. The implementation 500 of decentralized mixers 110 in a decentralized mixing system 100 as shown in FIG. 5 illustrates one particular implementation of how decentralized mixers may be utilized for a live performance, a rehearsal, and/or a recording situation for purposes of example. In the implementation 500 shown in FIG. 5, a plurality of microphones such as mic 510, mic 512, up to an Nth mic 514, may be fed into a submixer 516 to provide one or more inputs to mixer 100. For example, a relatively large number of microphones may be utilized to monitor and/or record a drum set, a choir, and so on using a single mixer 110. Alternatively, instead of a submixer 516 and a single mixer 110, two or more mixers 110 can be utilized to handle the drum set or the choir, or a suitable combination of mixers 110 and submixers 516 may be utilized depending on the number of microphones, the number of channels in the submixer, and/or the number of inputs in mixer 110. Similarly, a breakout box 524 may be utilized to combine the inputs one or more devices such as device 518, device 520, up to an Mth device 522. For example, a breakout box 524 may be utilized to combine devices having disparate inputs to provide suitable inputs for mixer 110. For example, device 518 may comprise a personal computer, device 520 may comprise a compact disk (CD) player 520, and/or device 522 may comprise a sequencer or synthesizer, as merely one example.

Furthermore, one mixer 110 may couple to an instrument 526 such as a bass guitar, and may also couple to the bassist's vocal microphone 528. Another mixer 110 may receive a stereo signal from a single instrument 530 such as a stereo guitar signal from the guitarist. Yet another mixer 110 may receive two mono inputs from a first instrument 532 and a second instrument 534 which may correspond to two keyboards from the keyboardist. It should be noted that other implementations besides implementation 500 of FIG. 5 may likewise be provided, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to decentralized audio mixing and recording and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A mixer, comprising:

an audio input circuit to receive one or more local audio input signals;

a network adapter to couple to a network and to receive one or more mix busses from one or more other mixers coupled to the network;

a digital signal processor to create a local mix of the local audio input signals in combination with the mix busses from the network; and a recording circuit to record the local mix, or to record the raw signals from the mix busses and the local audio input signals, or combinations thereof.

2. A mixer as claimed in claim 1, further comprising an audio output circuit to receive the local mix and to provide the local mix as an audio output signal.

3. A mixer as claimed in claim 1, further comprising an effects circuit to provide one or more effects on the local mix, or on the raw mix, or combinations thereof.

4. A mixer as claimed in claim 3, wherein the network adapter is capable of receiving one or more additional mix busses as one or more additional mixers are coupled to the network and wherein the digital signal processor is capable of adding the one or more additional mix busses to the local mix or adding the one or more additional mix busses to the raw mix, or combinations thereof.

5. A mixer as claimed in claim 4, wherein the recording circuit is capable of recording the local mix with the added one or more additional mix busses and wherein the recording circuit is capable of recording the raw mix with the added one or more additional mix busses.

6. A mixer as claimed in claim 1, wherein the network adapter comprises a wireless network adapter capable of communicating with a wireless network via a wireless networking protocol.

7. A method of decentralized mixing, comprising:

receiving one or more mix busses from a network via a network adapter;

transmitting one or more local inputs to the network as a network bus via the network adapter;

creating, via a digital signal processor, a local mix of the local inputs and the one or more mix busses received from the network;

recording, via a recording circuit, the local mix to a storage device; and recording, via a recording circuit, the raw local inputs and the one or more mix busses received from the network to the storage device.

8. A method as claimed in claim 7, further comprising receiving the local mix, via an audio output circuit, and providing the local mix, via the audio output circuit, as an audio output signal.

9. A method as claimed in claim 7, further comprising receiving, via the network adapter, one or more additional mix busses as one or more additional mixers are coupled to the network.

10. A method as claimed in claim 9, further comprising adding, via the digital signal processor, the one or more additional mix busses to the local mix.

11. A method as claimed in claim 9, further comprising recording, via the recording circuit, the one or more additional mix busses as part of the raw signals.

12. A method as claimed in claim 10, further comprising recording, via the recording circuit, the local mix with the added one or more additional mix busses.

13. A method as claimed in claim 7, further comprising monitoring the network, via the network adapter, for one or more additional network busses as one or more additional mixers are coupled to the network and adding one or more processing channels, via the digital signal processor, to process the one or more additional mix busses.

14. A decentralized mixer, comprising:

means for receiving one or more mix busses from a network;

means for transmitting one or more local inputs to the network as a network bus;

means for creating a local mix of the local inputs and the one or more mix busses received from the network;

means for recording the local mix; and means for recording the raw local inputs and the one or more mix busses received from the network.

15. A decentralized mixer as claimed in claim 14, further comprising means for receiving the local mix and means for providing the local mix as an audio output signal.

16. A decentralized mixer as claimed in claim 14, further comprising means for receiving one or more additional mix busses as one or more additional mixers are coupled to the network.

17. A decentralized mixer as claimed in claim 16, further comprising means for adding the one or more additional mix busses to the local mix.

18. A decentralized mixer as claimed in claim 16, further comprising means for recording the one or more additional mix busses as part of the raw signals.

19. A decentralized mixer as claimed in claim 17, further comprising means for recording the local mix with the added one or more additional mix busses.

20. A decentralized mixer as claimed in claim 14, further comprising means for monitoring the network for one or more additional network busses as one or more additional mixers are coupled to the network and means for adding one or more processing channels to process the one or more additional mix busses.

* * * * *